May 15, 1934.                R. W. DINZL                1,958,422
APPARATUS FOR MOLDING PLASTIC MATERIAL
Filed Sept. 1, 1930         6 Sheets-Sheet 1
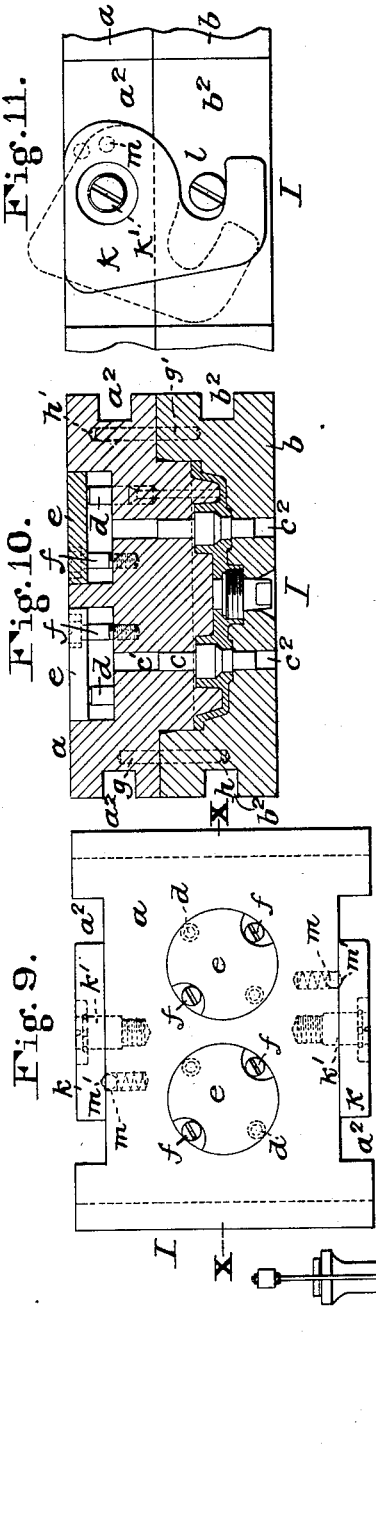
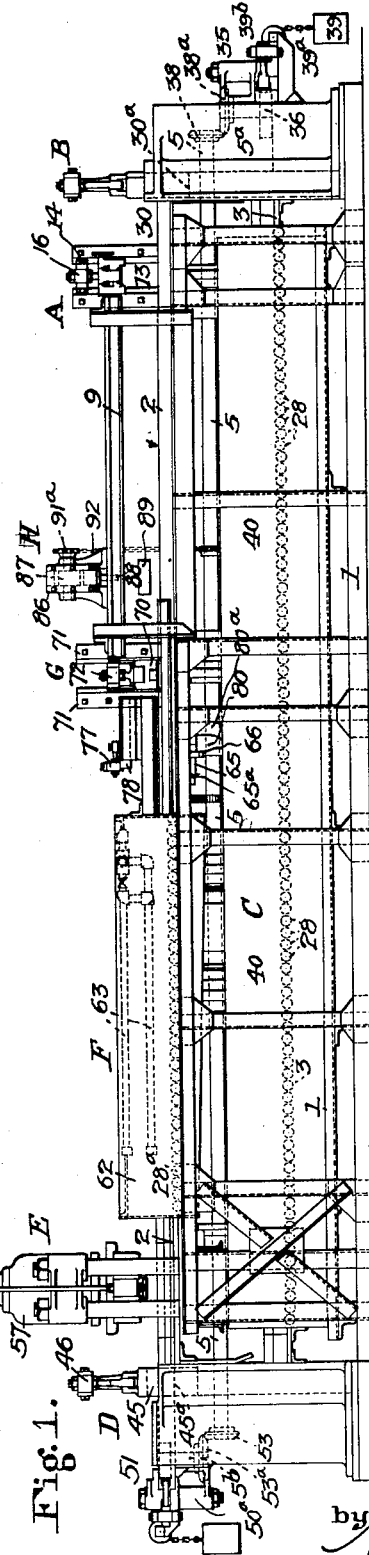
INVENTOR:
Richard W. Dinzl,
by
Atty May 15, 1934. R. W. DINZL 1,958,422
APPARATUS FOR MOLDING PLASTIC MATERIAL
Filed Sept. 1, 1930 6 Sheets-Sheet 2
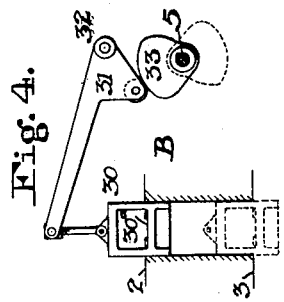
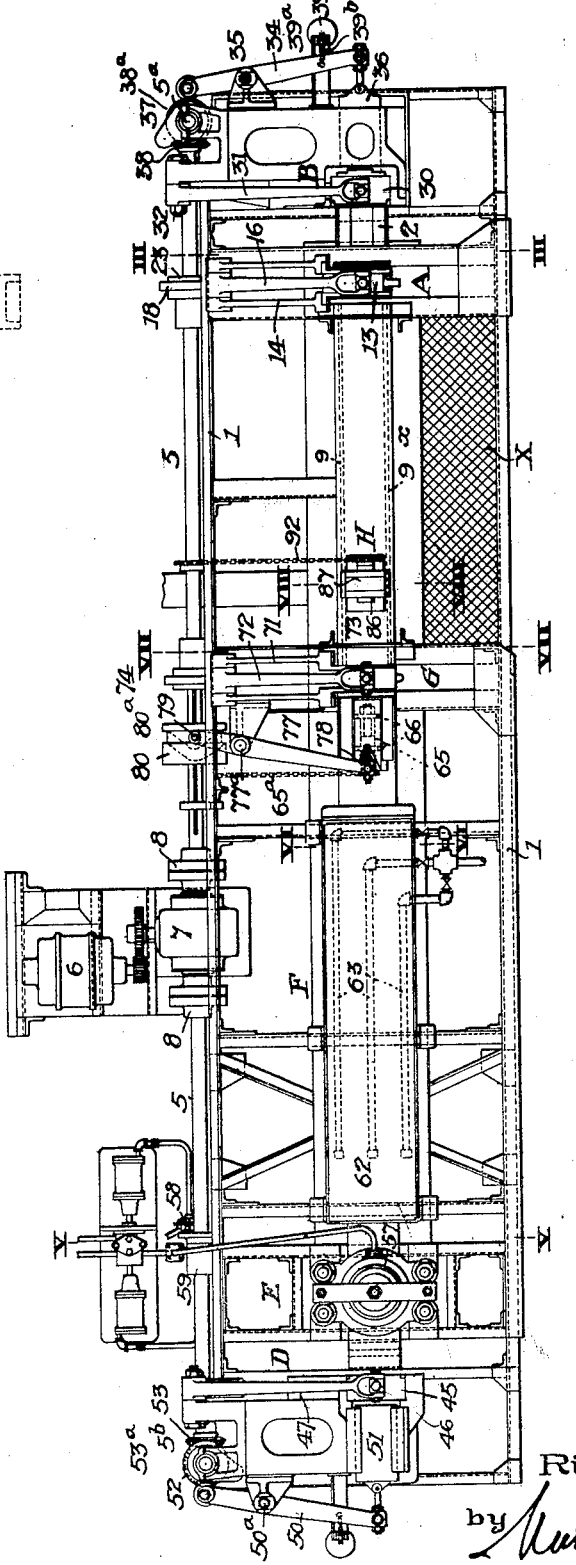
INVENTOR:
Richard W. Dinzl May 15, 1934.   R. W. DINZL   1,958,422
APPARATUS FOR MOLDING PLASTIC MATERIAL
Filed Sept. 1, 1930   6 Sheets-Sheet 3
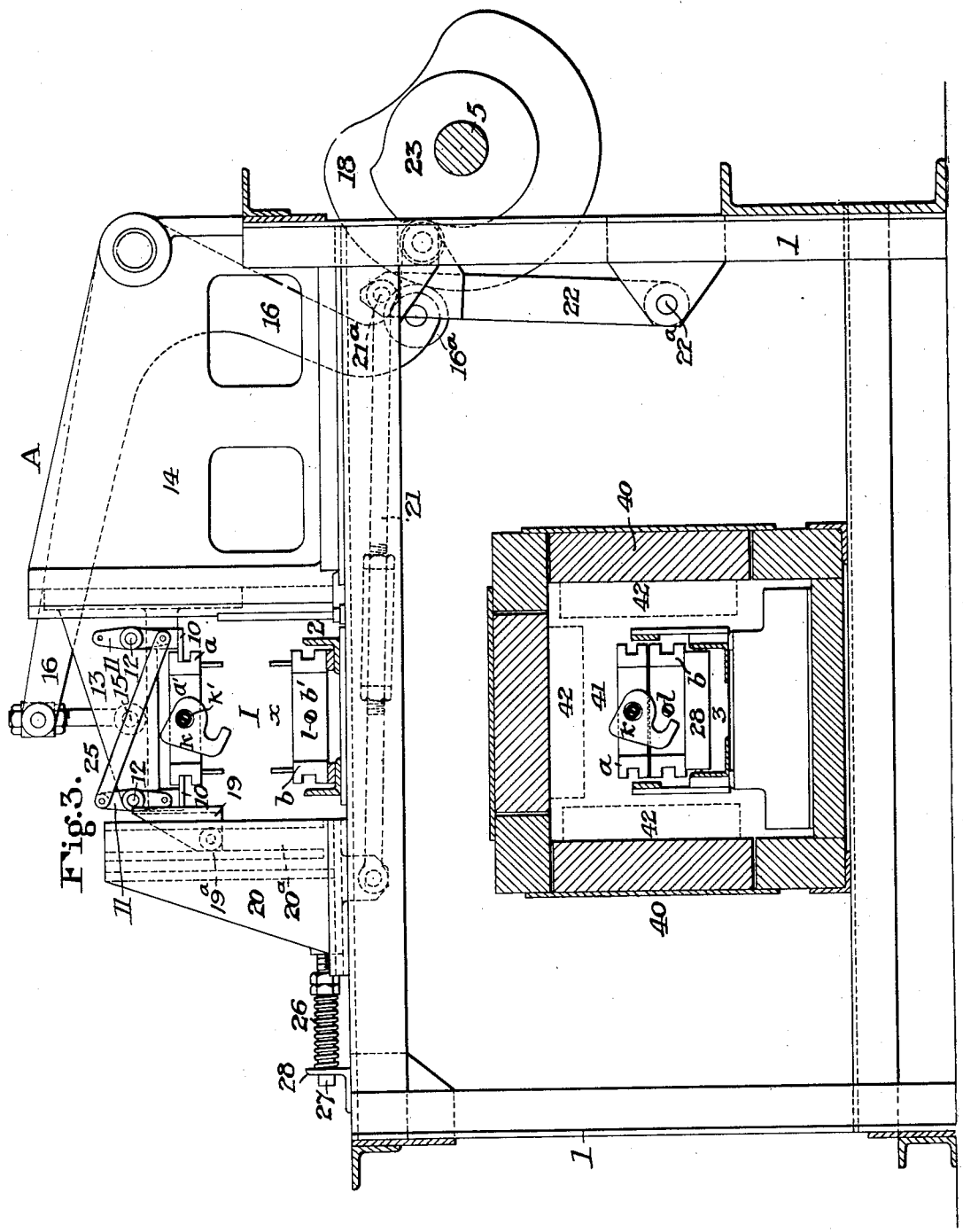
INVENTOR:
Richard W. Dinzl,
by Murray C. Boyer
Atty.

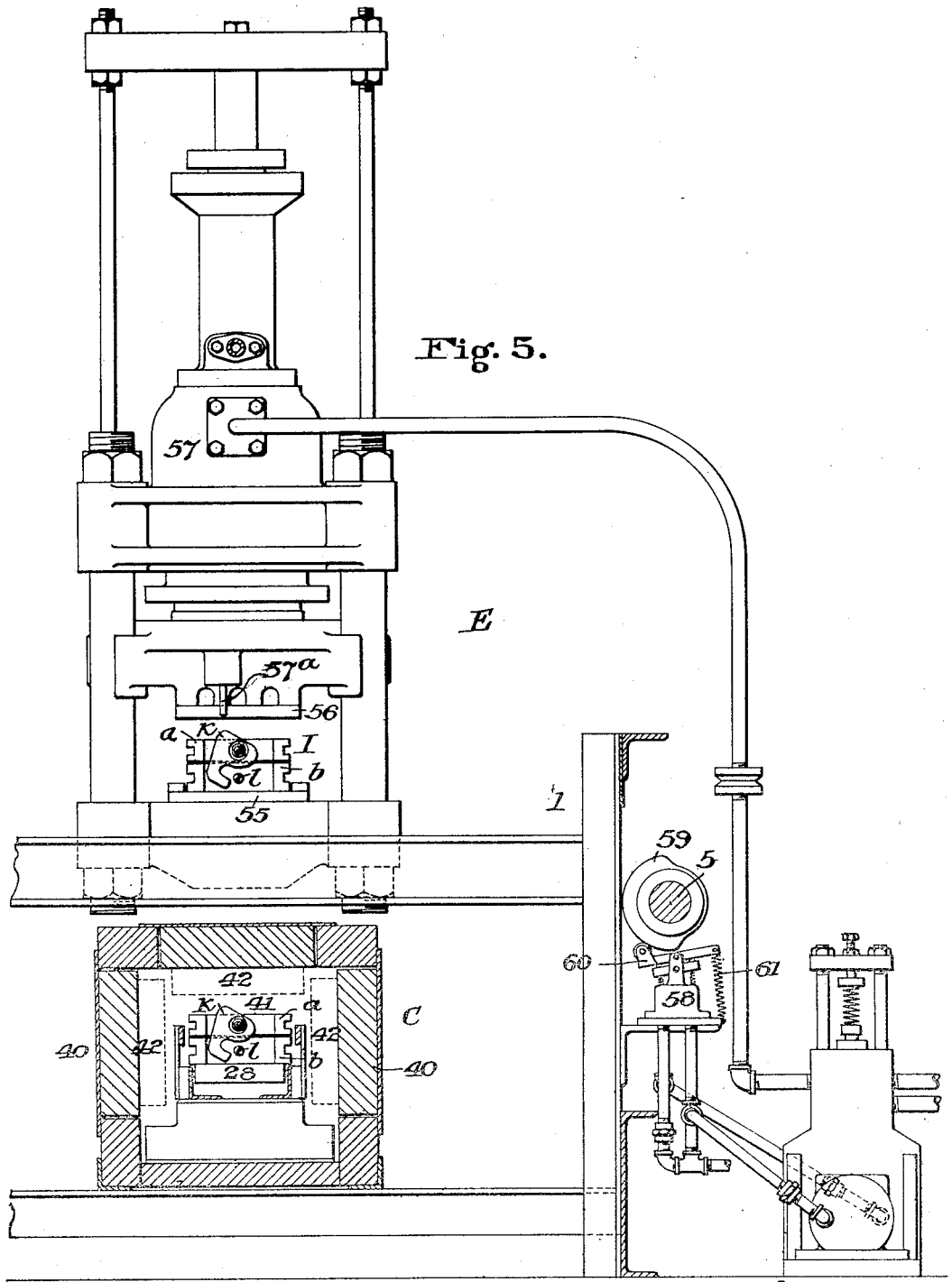

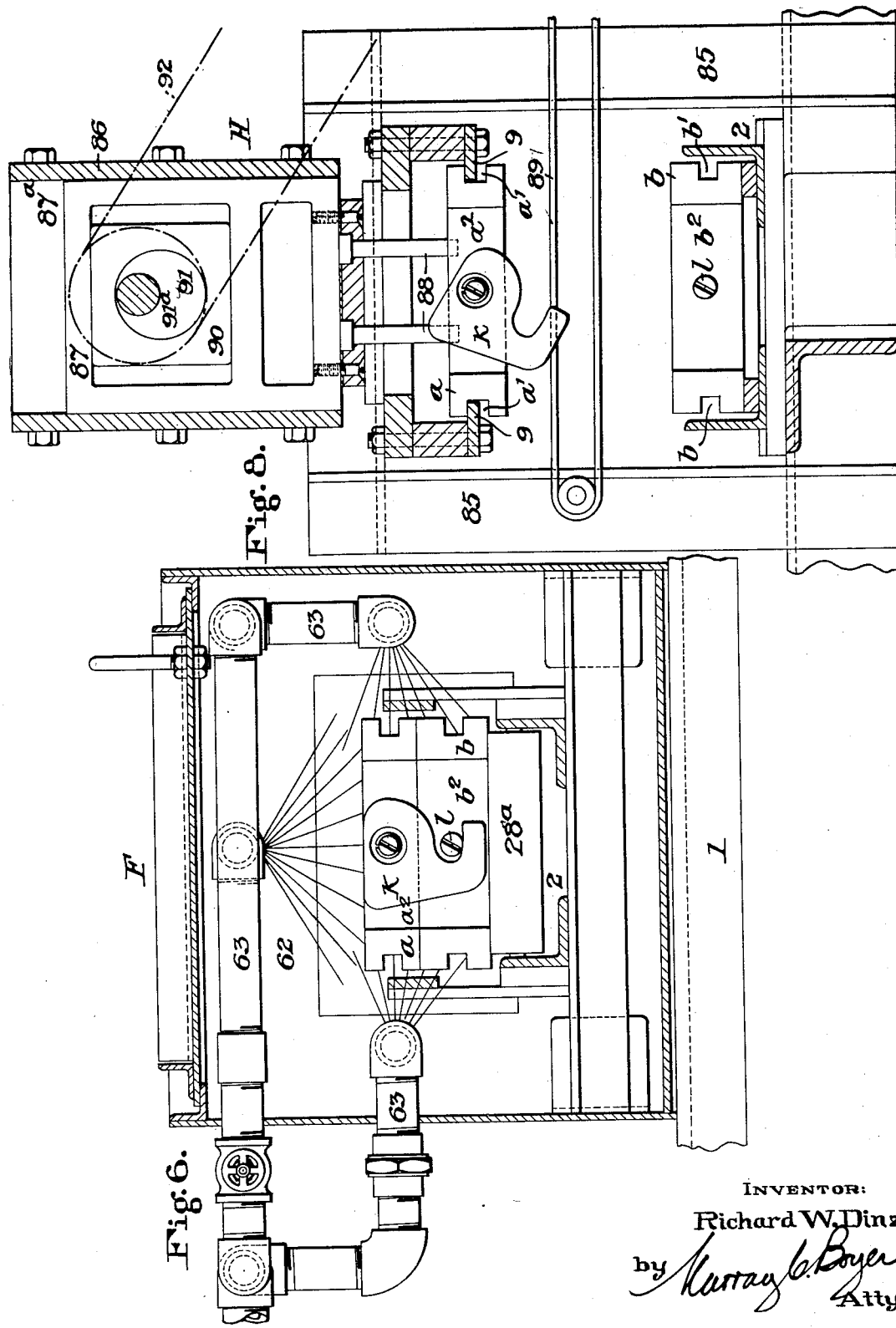

May 15, 1934.  R. W. DINZL  1,958,422
APPARATUS FOR MOLDING PLASTIC MATERIAL
Filed Sept. 1, 1930   6 Sheets-Sheet 6
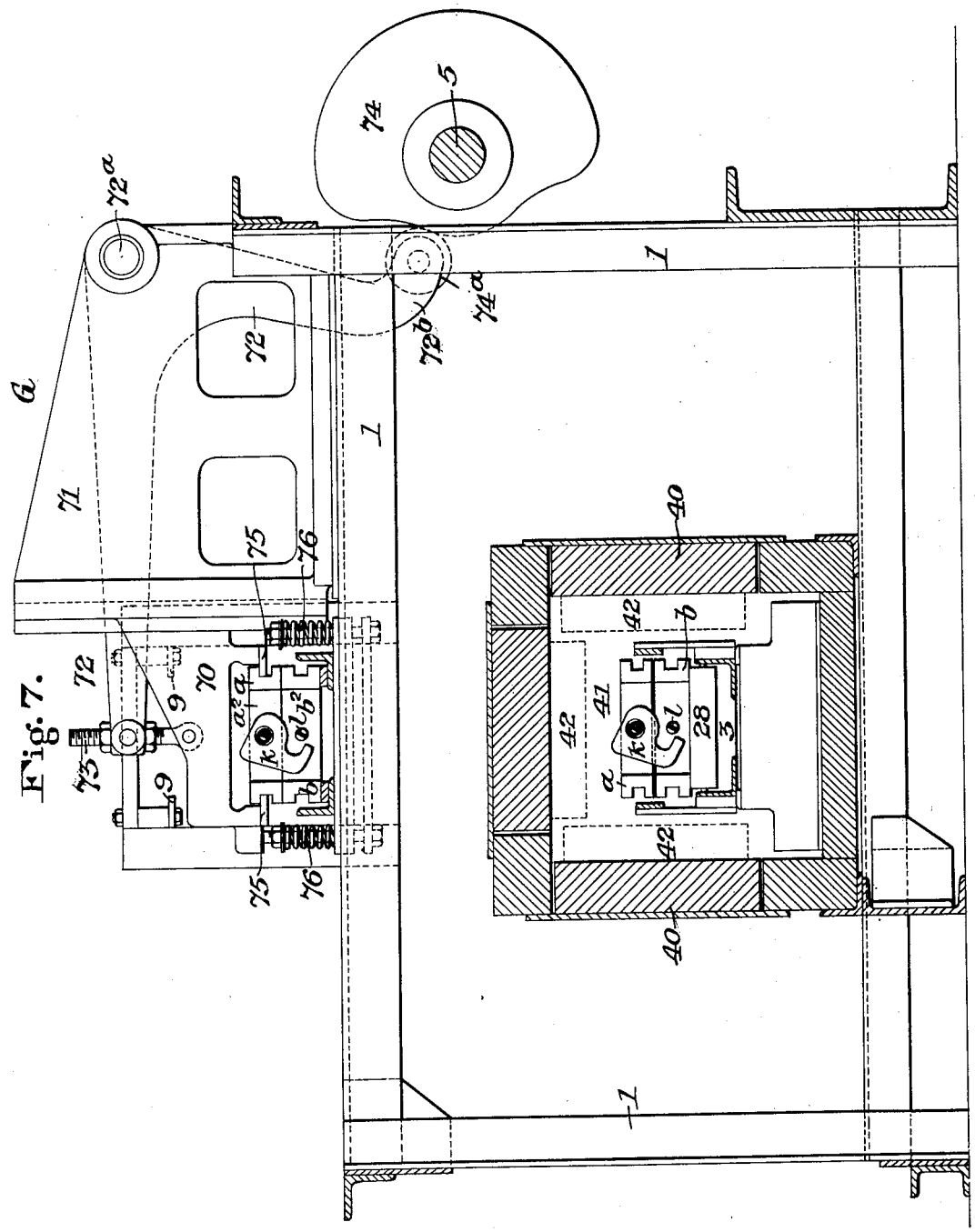
INVENTOR:
Richard W. Dinzl,
by Murray C. Boyer
Atty.

Patented May 15, 1934

1,958,422

UNITED STATES PATENT OFFICE 1,958,422

APPARATUS FOR MOLDING PLASTIC MATERIAL

Richard W. Dinzl, Philadelphia, Pa., assignor to General Motors Corporation, Detroit, Mich., a corporation of Delaware Application September 1, 1930, Serial No. 479,115

22 Claims. (Cl. 18—4)

My invention relates to the manufacture of articles from plastic material, and comprises improved mechanism for the continuous production of articles made from forms of plastic material which are plastic when in a heated condition and which set by cooling rather than by a chemical action in the material itself.

My invention further comprises means whereby unit quantities of such plastic material, preferably in the form of slug charges, may be introduced into suitable molds, then subjected to a heating operation, then compressed in such molds, during which time the molds are locked together; thence conveyed to a cooling chamber, thence conveyed to a point where the sections of the mold are opened or separated, and then moved to the point where the molded articles are stripped from the upper mold sections and, preferably, discharged onto a traveling conveyer. After such removal the respective mold sections are conveyed in registering but separated condition; the lower mold sections being brought into position to receive fresh unit charges of the plastic material and, after such reception, have the upper mold sections placed thereon. The filled molds are then carried continuously through the various steps necessary to shape and harden such unit charges of plastic material into finished articles; all of such work being carried on automatically, after the molds have been charged, to the point of delivery of the finished articles.

My invention further comprises the various mechanisms which cooperate in effecting the completion of the molded articles, from the mold-closing point to the mold-opening point and stripping means.

These and other features of my invention are more fully described hereinafter; reference being had to the accompanying drawings, more or less diagrammatic in character, in which:

Figure 1 is a side elevation of apparatus for molding articles of plastic material, within the scope of my invention. Fig. 1a is a fragmentary view, partly in section, illustrating on a slightly larger scale a detail of the structure shown in Fig. 1.

Fig. 2 is a plan view of the same.

Fig. 3 is an enlarged cross-sectional view taken on the line III—III, Fig. 2, looking in the direction of the arrow and showing an elevation of the mold-closing means.

Fig. 4 is a fragmentary view, showing in detached elevation the mold-lowering means employed at the right-hand end of the machine.

Fig. 5 is an enlarged cross-sectional view taken on the line V—V, Fig. 2, looking in the direction of the arrow and showing an elevation of the press mechanism.

Fig. 6 is an enlarged cross-sectional view taken on the line VI—VI, Fig. 2, looking in the direction of the arrow and showing the cooling chamber in section.

Fig. 7 is an enlarged cross-sectional view taken on the line VII—VII, Fig. 2, looking in the direction of the arrow and showing an elevation of the mold-parting means.

Fig. 8 is an enlarged elevational view of the stripping means, partly in section on the line VIII—VIII, Fig. 2.

Fig. 9 is a plan view of one of the molds.

Fig. 10 is a sectional view of a complete mold, taken on lines X—X, Fig. 9, and

Fig. 11 is an enlarged view showing in elevation a detail of the mold structure, including one of the locking latches and means for releasing the same.

In the present instance my improved apparatus has been designed for the production of storage battery cell covers, such for instance, as those disclosed in the application of H. D. Geyer, filed April 29, 1929, Serial No. 358,804. It will be understood, of course, that machines embodying the features of my present invention may be employed for the molding of other articles without departing from the spirit and scope of the same.

My improved apparatus comprises a longitudinal frame carrying the several mechanisms employed for operating upon the molds and transporting them from and to the mold-closing point. These mechanisms include mold-closing means, indicated generally at A, and illustrated in Fig. 3; mold-lowering means at the right-hand end of the machine, indicated generally at B, and illustrated in Fig. 4; a heating chamber or oven, indicated generally at C, and illustrated in Fig. 1, and in the several cross-sectional views; elevating mechanism at the left-hand end of the machine, indicated generally at D, and illustrated in Figs. 1 and 2; press mechanism at such end of the machine, indicated generally at E, and illustrated in Fig. 5; a cooling chamber disposed beyond the press mechanism, indicated generally at F, and illustrated in Fig. 6; mold-parting mechanism, indicated generally at G, and illustrated in Fig. 7, and the stripping mechanism, indicated generally at H, and illustrated in Fig. 8. The molds are indicated generally at I, and are illustrated in detail in Figs. 9, 10 and 11.

Referring to the accompanying drawings, the several views of which illustrate the details of construction of my improved molding apparatus, 1 indicates a longitudinal frame provided with upper and lower tables 2 and 3, upon which the molds are conveyed and moved step-by-step by suitable pushing mechanisms which, arranged to act upon mold units at certain points, serve to push the same forward at such points successively together with the several molds or mold sections in advance of those engaged by such pushing mechanisms. The several mechanisms are operated in timed relation by means of cams carried by a main driving shaft 5, which may be driven by a motor 6 through a reducing gear train 7, and clutch mechanism 8.

In order that the operation of my improved molding apparatus may be fully understood, it may be desirable to describe the character of the molds employed therewith. These molds, indicated generally at I, are illustrated in detail in Figs. 9, 10 and 11, in addition to the showing illustrated in the several cross-sectional views. They may comprise upper sections or dies $a$, and lower sections or molds $b$ complemental thereto; the internal contour being such as to provide space for the shaping of the desired article which, in the present instance, is a battery cell cover. The upper and lower mold sections have grooved sides or ends indicated at $a'$ and $b'$, respectively, as clearly indicated in Figs. 8 and 10. Internally they are provided with the necessary core members $c$ to form the desired openings in the cell covers. In addition, stripper pins $d$ are provided, which may be in pairs and are located beneath movable operating members which may be disks $e$, suitably guided on headed pins $f$ so that said disks may be maintained in the plane of the top surface of the upper mold sections. Additionally, the several mold sections may be provided with dowels and complemental sockets which may be arranged in staggered relation, that is to say, the upper mold sections may carry dowels $g$ at opposite corners arranged to enter similarly placed apertures $h$ in the lower mold sections, while the latter may have dowels $g'$ at the other opposite corners arranged to enter apertures $h'$ in the upper mold sections. Any arrangement that will insure registry of the mold sections is within the scope of my invention and when articles of the character illustrated in cross-section in Fig. 10 are being molded; such articles requiring core pins such as indicated at $c$, the dowels may be omitted since such core pins are adapted to fit apertures $c'$ and $c^2$ in the upper and lower mold sections respectively. After the heated plastic material has been compressed, the mold sections are locked together so that during the setting of the molded articles they will be firmly held. For this purpose I may provide the upper mold sections with latches, indicated at $k$, pivoted thereto at $k'$ and adapted to engage pins $l$ carried by the lower mold sections; Fig. 11 showing the position of the latches in the operative and inoperative conditions.

To assist in holding the latches in the inoperative position, indicated by dotted lines, I may provide spring-pressed locking means which may be in the form of balls $m$ carried by the upper mold sections and adapted to enter recesses $m'$ formed in the adjacent faces of the latches. The latches are mounted in the complemental recesses $a^2$—$b^2$ formed in the sides or ends of the mold sections and the faces of the latches are in the same plane as the end portions of such mold sections so that as they are moved through the machine, the latch-carrying sides are in contact with other molds before and behind the same.

In commencing the operation of the machine the operator, who may stand on the platform X, fills a lower mold section with a slug charge of plastic material at the point $x$, and presents the same to the mold-closing mechanism, shown more clearly in Fig. 3, which brings an upper mold section $a$ into nominal contact or engagement with a lower mold section $b$, and partially closes the same. In such position a lower mold section is in registry beneath an upper mold section carried by the mold-closing means. Just in advance of the mold-closing means are rails 9 upon which the upper mold sections have been advanced to the mold-closing means, which latter mechanism includes a pair of horizontally positioned rails 10, aligned with the rails 9, and upon which the upper mold sections are pushed. The grooved sides of the mold sections permits them to be moved upon rails in the manner indicated. The rails 10 are carried by oppositely disposed levers 11, pivotally supported at 12, upon a head 13 vertically movable in suitable guide-ways on a bracket 14 carried by the upper table 2 of the frame. The head 13 is pivotally hung at 15 from the end of a bell-crank lever 16, pivoted to said bracket 14 at 17, and having its shorter end engaged by a cam 18 on the shaft 5; a roller 16ª being carried by such shorter end of the lever for engagement with the cam 18. Fig. 3 shows the parts in the upper and separated condition. The head 13 and connected parts are of such weight as to drop by gravity when the low part of the cam 18 comes opposite the shorter end of the bell-crank lever 16.

One of the levers 11 supporting one of the rails 10 is connected to a member 19 adapted for vertical sliding movement in guide-ways of a bracket 20 arranged for movement toward and from the fixed bracket 14, and movement may be imparted to said bracket 20 in one direction by a link 21 pivotally connected at 21ª to an arm 22 pivoted at 22 to the frame 1; such arm being actuated by a cam 23 also mounted on the shaft 5 adjacent to the cam 18. As the head 13 lowers to deposit an upper mold section $a$ upon a lower mold section $b$, the bracket 20 is moved to the left and carries the member 19 with it; the latter having a roller 19ª movable in its guide-way 20ª, and this action shifts the lever 11 connected to the member 19 and retracts the rail 10 carried thereby from its engagement with the upper mold section and by reason of a link 25 connecting the levers 11, the opposite rail 10 is displaced from the upper mold section so that when the head 13 nears the limit of its downward movement, the upper mold section is released and drops onto the lower mold section which has been previously filled with a slug charge of the plastic material. As the shaft 5 continues to turn, the high side of the cam 18 reacts upon the short end of the bell-crank lever 16 and causes the latter to lift the head 13 and its associated parts into position to permit its rails 10 to receive a succeeding upper mold section from the rails 9. At the same time a spring 26 carried by a pin 27 projecting from the bracket 20 and which has been compressed against a stop 28 on the frame reacts to push the bracket 20 into the position shown in Fig. 3 and keeps the arm 22 connected to said link in operative engagement with the cam 23.

From the mold-closing mechanism, the closed molds pass to a so-called "elevator" which serves to lower them to a position in line with the lower table 3 of the frame. At this point a pushing device serves to push the closed molds successively onto said table 3, which is preferably provided with rollers 28, so that the successively introduced molds may be advanced more or less readily by the movement imparted to the last mold presented to the pushing device.

The "elevator" or lowering device for transferring the filled molds from the table 2 to the table 3, may comprise a vertically movable member 30, provided with a platform 30$^a$ which may be placed in alignment with the upper and lower tables 2 and 3. This slidable member may be operated by a lever 31 suitably carried by the frame of the machine; being pivoted at the point 32 and connected at its opposite end to the member 30. The position of the lever 32 and of the vertically sliding member 30 is controlled by a cam 33 mounted on the shaft 5, so that when a mold has been pushed away from the upper table 2 onto the platform 30$^a$ of said slidable member 30, the latter lowers until such platform is aligned with the lower table and with pushing mechanism, which may comprise a lever 34, pivoted at 35 and arranged for horizontal movement so as to actuate the plunger 36 which engages the mold. This lever 34 is operated in one direction by a cam 37 carried by a vertical shaft 5$^a$ which may be actuated from the shaft 5 through the bevel gears 38 and 38$^a$. This pushing device is returned to normal position by means of a weight 39 carried by a chain 39$^a$ connected to the plunger 36 and passing over a roller 39$^b$. When the plunger has been retracted, the slidable member 30 may be lifted for the reception of the next mold, which may be transferred to the table 3 in a similar manner.

The lower table 3 is enclosed by a suitable casing 40 providing a heating chamber 41, which may be heated by suitable means; electric radiators, for instance, which may line the side and top walls of the same, as indicated at 42 by dotted lines. Within the heating chamber the plastic material is heated to an extent sufficient to permit the mold sections to be finally closed and locked after compression has imparted the desired shape to such plastic material. As freshly filled molds are being introduced at one end of this heating chamber, it follows that as soon as the chamber is filled, a mold will be discharged for each one introduced. At the discharge end of the heating chamber, therefore, I provide elevating mechanism, and when a mold is moved onto the platform of the same, such elevating mechanism is raised until its platform carrying such mold is aligned with the upper table 2.

This elevating mechanism may include a slidable member 45 of a character similar to the slidable member 30 at the opposite end of the machine by means of which the filled molds are lowered from the table 2 to the table 3. Such slidable member has a platform 45$^a$ and it is connected at 46 to a lever 47 pivoted at 48 and actuated by a cam 49 on the shaft 5; the operation of such cam being so related to the timed operation of the rest of the mechanism that the slidable member 45 will be raised as soon as a mold has been moved onto its platform 45$^a$ from the heating chamber 41. When the mold so lifted is in alignment with the upper table 2, a pushing device, similar to that at the opposite end of the machine may be brought into action. This may comprise a lever 50, pivotally mounted at 50$^a$ and pivotally connected at one end to a plunger 51, while its opposite end is in engagement with a cam 52, carried by a short vertical shaft 5$^b$ which may receive motion from the shaft 5, through the bevel gears 53 and 53$^a$.

From the platform 45$^a$ of the elevator member 45, the mold is moved into position on the lower platen 55 of a suitable press E, and immediately such mold is positioned on such lower platen, the upper platen 56 descends and closes the molds; compressing the heated charge of plastic material within the same to the contour provided by the internal shape of the respective mold sections. The operation of the upper press platen is effected by fluid under pressure direct to the cylinder 57; the supply of such fluid being controlled by a four-way or other valve 58, actuated by a cam 59 on the shaft 5; such cam acting upon a lever 60 connected to the valve stem to open the valve, and such lever being moved by a spring 61 to close the valve. The upper platen of the press carries suitable projections 57$^a$ which engage the latches $k$ pivotally mounted in the recessed sides of the upper mold sections and as the mold sections are closed by the engagement of such platen, these latches are simultaneously moved into locking position; engaging the pins $l$ on the lower mold sections and locking the molds together.

As the next mold is advanced onto the lower press platen, the previously pressed and locked mold is pushed off the same onto the upper table 2, and by subsequent pushing actions upon the successively pressed and locked molds, they are introduced into a cooling chamber 62, having a bottom or floor of freely movable rollers 28$^a$ over which the molds move. This cooling chamber is provided with spray pipes 63, which may be positioned at its top and sides so that a cooling liquid, water for instance, may be sprayed onto the heated molds while they are in such chamber and, as in the case of the heating chamber, as soon as such cooling chamber is filled with molds, the introduction of a heated mold at the inlet end thereof by the action of the pushing element will cause a cooled mold to be discharged from such cooling chamber, and the molds so discharged will be successively advanced to a point where means are provided for parting or separating the sections of the same.

Before the mold sections may be parted or separated, the latches locking the sections together must be released. For this purpose I may provide a continuously driven device in the form of a drum or cylinder 65, having at its opposite series of dogs or teeth 66 which are spaced apart the distance of the latches; such drum being positioned beneath the path of the molds at a point just in front of the mold-parting means. This drum, shown more particularly in Figs. 1, 1$a$, 2 and 11, may be driven from the shaft 5 by means of a chain 65$^a$; which passes over a chain wheel at the end of the drum 65. The operation of these dogs may be so timed as to be in position for engagement with the latches at the opposite sides or ends of the mold when the latter has been advanced to the position directly above said drum, and to permit such mold to be advanced to the parting means before such dogs are brought into operative position with respect to the next and succeeding molds whose latches are to be released.

The mold sections are horizontally grooved at their sides in line with the direction of their travel, and when they are positioned with respect to the parting or separating mechanism, illustrated in Fig. 7, the projecting portions overhanging the grooves of the upper sections are in position for operative engagement by the same.

This mechanism includes a head 70 vertically movable in a suitable guide-way formed in a bracket 71 carried by the frame 1. A bell-crank lever 72, pivotally hung in said bracket at 72ª is operatively connected at one end to the head 70 by an adjustable connection 73; the shorter end 72ᵇ of said lever being in engagement with a cam 74 mounted on the shaft 5, and a roller 74ª carried by such shorter end is interposed between the same and the cam. When the molds are moved to this parting mechanism, the head 70 is in the lowered position, as indicated, and the molds are pushed to a position beneath said head which carries rails or ledges 75 onto which the projecting portions of the upper mold sections may ride. Springs 76 may be provided to cushion the head when it lowers; such action being by gravity as permitted by the low side of the cam 74. As the shaft 5 continues to rotate, the cam 74 moves the lever 72 and elevates the head 70 until the rails or ledges 75 of the same are in horizontal alignment with the rails 9 onto which the upper mold sections may be pushed by a device arranged in advance of the parting means. It may be desirable to provide side bars or rails to engage the grooved sides of the lower mold sections to hold them down while the upper mold sections are being separated therefrom and lifted. The pushing device for moving the upper mold sections from the rails or ledges 75 on the rails 9 may comprise a lever 77, pivotally mounted at 77ª and connected at one end to a plunger plate or pusher 78 aligned with the rails or ledges 75 of the head 70 when the latter is in the upper position, and the rails 9; the opposite end of such lever 77 having a roller 79 engaging the groove 80ª of a cam 80 carried by the shaft 5. When the head 70 has raised the upper mold section to its aligned position with the rails 9, the plunger plate 78 is actuated by the cam 80 and pushes the upper mold section with the molded article within the same, onto said rails 9.

The next operation is to strip the molded article from the upper mold section. As a second upper mold section is advanced on the rails 9, the first upper mold section moved onto the same has been positioned beneath the stripping means, illustrated more particularly in Fig. 8.

At this stripping point, the frame 1 supports a supplemental frame 85, arranged above the table 2 and surmounted by a suitable casing 86, in which a yoke member 87 is adapted to be moved vertically; the lower end of such member carrying a pair of stripper pins 88, aligned with the disks e of the upper mold sections, so that when such pins 88 are lowered, they engage the disks and through the stripper pins d carried by the upper mold sections, which are in proper relative position with respect to the molded article, the battery cell cover for instance, the latter will be ejected from the upper mold section and drop onto a conveyer belt 89 disposed beneath such stripper means. The member 87 is slotted at 87ª for the reception of an actuating block 90 which is moved by an eccentric 91 carried on a shaft 91ª, to which motion may be imparted by a chain 92 from the shaft 5. As soon as a mold section is stripped it is moved forward on the rails 9 by the succeeding mold sections.

As successive upper mold sections are pushed forward on the rails 9, the forward section is advanced to the mold-closing point. In the meanwhile the lower mold sections have been moved forward beneath the upper mold sections in more or less exact registry; the conveyer belt 89 passing between the same, and during this period the operator, who may stand on the platform X located beneath the lower table 3 and between the stripping point and the mold-closing point, places fresh slug charges of plastic material in the lower mold sections passing before him. When these lower mold sections are in registry with the upper mold sections at the mold closing point, the closing mechanism descends and brings the mold sections together. In this action, the upper mold sections pass from the rails 9 onto the rails 10 carried by the closing mechanism. As fast as one mold is filled, it is automatically advanced to the lowering means before described and lowered into position to be pushed onto the lower table 3, thence to the heating chamber; the elevating means from the same; the pressing and locking mechanism; the cooling chamber; through the latter to the unlocking means; the parting or opening means, and finally the stripping means, and so on; the operation being a continuous one after the apparatus is completely filled with molds.

It will be understood, of course, that while it is intended that the separated mold sections shall move in unison so as to be in registry when the mold-closing point is reached, the operator may correct the position of the respective sections and insure that they are in registry before the closing mechanism operates. While the mold sections may be provided with dowel pins that will register with complemental openings relatively placed so that the respective mold sections will be centred with respect to each other before the closing mechanism operates, these dowels may be omitted if centering may be effected by core pins employed in connection with the articles molded.

Power to actuate the several mechanisms may be taken from the main shaft 5 extending longitudinally of the frame, which shaft may be driven from the motor 6 with or without speed-reducing mechanism. This shaft carries the several cams whereby the several mechanisms are operated in proper sequence and timed relation. The pushing mechanism whereby the filled molds are introduced into the heating chamber and the pushing mechanism delivering the molds to the press platen may be driven from vertically disposed counter shafts which receive their motion from the main shaft 5 through bevel gears. Each pusher is moved in one direction by a cam and effects movement of all of the molds on the respective tables and, in the present instance, in the opposite direction by means of a weight. Equivalent means, such as a spring, for this return movement, is within the scope of my invention.

While I have shown certain specific forms of mechanism for carrying out the features of my inventon, it will be understood that I do not wish to be limited thereto, and that my improved molding apparatus may be developed in other ways for the accomplishment of the desired molding operation wherein a continuous operation is carried out and molds are successively operated upon after the machine has been completely filled.

I claim:

1. The combination, in a machine of the character described, of a frame providing a table, molds adapted to travel on said table continually from and to a closing point, means for closing filled molds, a heating chamber, means for delivering the molds from said closing point to the heating chamber, pressing means adjacent to the discharge end of said heating chamber, means for continually delivering molds from said heating chamber to the pressing means; the pressing means serving to lock the mold sections together and the contact of the mold being delivered to the press with the mold therein serving to advance said previously pressed and locked mold, parting means for the molds disposed beyond the pressing means, separate trackways for the mold sections beyond the parting means, and means for stripping the molded articles from the upper mold sections.

2. The combination in a machine of the character described, of a frame providing a table, molds adapted to travel on said table continually from and to a closing point, means for closing filled molds, a heating chamber, means for delivering the molds from said closing point to the heating chamber, pressing means adjacent to the discharge end of said heating chamber, means for continually delivering molds from said heating chamber to the pressing means; the pressing means serving to lock the mold sections together and the contact of the mold being delivered to the press with the mold therein serving to advance said previously pressed and locked mold, parting means for the molds disposed beyond the pressing means; said parting means including a carrier for the upper sections of said molds, rails onto which said upper mold sections may pass from said parting means, and means for stripping the molded articles from said upper mold sections; said upper mold sections moving in unison on said rails with the lower mold sections which move on the table to the closing point and said closing means including a carrier receiving the upper mold sections from said rails whereby they may be brought into proper registry with and lowered onto successive lower mold sections positioned beneath the same.

3. The combination, in a machine of the character described, of a frame providing a pair of tables in vertical alignment, molds adapted to travel on said tables continually from and to a closing point on said upper table, means for closing filled molds, means for delivering said closed molds to the lower table, means for heating said molds on said lower table, means for moving the molds through the heating means, an elevator at the end of the heating means for raising the molds successively to the level of the upper table, press mechanism arranged adjacent to said elevating means, means for delivering molds from the elevating means to the pressing mechanism and simultaneously ejecting previously pressed molds therefrom, parting means for said molds disposed beyond the pressing means; said parting means including a carrier for the upper sections of the molds, separate trackways for the separated mold sections, and stripping means for discharging the molded articles from said upper mold sections.

4. The combination, in a machine of the character described, of a frame providing a pair of tables in vertical alignment, molds adapted to travel on said tables continually from and to a closing point adjacent to said upper table, means for closing filled molds, means for delivering said closed molds to the lower table, means for heating said molds on said lower table, means for moving the molds through said heating means, an elevator at the end of the heating means for raising the molds successively to the level of the upper table, pressing mechanism arranged adjacent to said elevating means, means for delivering molds from the elevating means to the pressing mechanism and simultaneously ejecting previously pressed molds therefrom, parting means for said molds disposed beyond the pressing means; said parting means including a carrier for the upper mold sections, rails onto which said upper mold sections may pass from said parting means, means for pushing said upper mold sections from said carrier onto said rails; said upper mold sections carrying the molded articles, and means for stripping the molded articles from said upper mold sections the latter moving in unison with the lower mold sections to the closing point and the closing means having a carrier receiving the upper mold sections from said rails whereby they may be brought into proper registry with and lowered onto successive lower mold sections containing charges of plastic material and positioned beneath the same.

5. In a structure such as set forth in claim 1, upper and lower tables receiving the mold sections and molds, and means for lowering the molds at one end of the table and raising the molds at the opposite end of the table, and common means for actuating said lowering and raising means simultaneously; the elevating means receiving a mold at the end of a line of molds while a mold is being added to said line.

6. In a structure such as set forth in claim 1, fluid operated mechanism for pressing successive molds, means for locking the mold sections together during the pressing operation, a valve controlling such fluid operated mechanism, means for actuating said valve to open and closed positions, and means for advancing a mold to and from the press platen when the pressing mechanism is opened.

7. In a structure such as set forth in claim 1, a shaft extending longitudinally of the frame, cams carried by said shaft for actuating the various mechanisms at the respective stations including the pusher mechanism located adjacent to the mold-parting means, a vertically arranged shaft, a cam carried thereby for operating the pusher delivering molds to the heating chamber, and means for driving said vertical shaft from the longitudinal shaft.

8. In a structure such as set forth in claim 1, a shaft extending longitudinally of the frame, means carried by said shaft for actuating the various mechanisms at the respective stations including the pushing mechanism located adjacent to the mold-parting means, a pair of vertically arranged shafts disposed at opposite ends of the machine, a cam carried by one of said shafts for operating the pusher delivering the molds to the heating chamber, a cam carried by the other shaft for operating the pusher delivering molds to the press mechanism, and means for driving said vertical shafts from the longitudinal shaft.

9. In a structure of the character described, mold-closing means including a vertically movable carrier for the upper mold section comprising supporting means attached to said carrier and adapted to releasably engage said mold section, means for lowering said carrier, and automatic means for gradually releasing the upper mold section from the supporting means on said carrier as said carrier reaches the limit of its downward movement.

10. In a structure such as set forth in claim 9, a pair of rails on the mold closing means, levers pivotally mounted for carrying said rails, an operative connection between said levers, means for lowering the rails, and means for simultaneously separating them to release the upper mold section as they are lowered.

11. In a structure of the character described, the combination of a pair of tables in vertical alignment, means for moving molds in opposite directions step-by-step on said tables, means for displacing the several molds from one table to the other including lowering mechanism at one end and elevating mechanism at the other end, and means for imparting simultaneous movement to said lowering and elevating mechanisms whereby when a mold is moved onto each table a mold will be displaced therefrom at the opposite end thereof.

12. In apparatus for making die-molded articles, a table having a plurality of stations at which forming operations occur, a plurality of mold structures comprising matching sections, means for moving each mold structure from one station to a succeeding station, means for bringing together the separable sections of a mold at one of said stations, a heating chamber disposed apart from said table and at a different level, means for automatically moving successive mold structures from said table to the level of said heating means, means for moving successive mold structures into; through, and from said heating means, means for returning mold structures to the level of said table, and means for moving each mold structure to said table.

13. In apparatus for making die-molded articles, a table having a plurality of stations thereon at which various steps are performed on the article to be made, means for performing other steps in the formation of said article; said means being located in the same vertical plane as some of said stations but in a different horizontal plane, a plurality of mold structures each adapted to pass through said stations and to said means, and means for continually and automatically transferring said mold structures without inverting the same from one of said stations to said first-named means.

14. In apparatus for making die-molded articles, a table having a plurality of stations at which various steps are performed on the article to be made, means for performing other steps on said article; said means being located in a different horizontal plane from that of said stations, a plurality of mold structures each adapted to pass through all of said stations, means for continually and automatically transferring said mold structures from one of said stations to said first-named means, and means for continually and automatically transferring mold structures from said first named means to another of said stations.

15. In apparatus for making die-molded articles, a table having a plurality of stations thereon at which various steps are performed on the article to be made, means for performing other steps in the formation of said article located in the same vertical plane as some of said stations but in a different horizontal plane, a plurality of mold structures each adapted to pass through said stations and said means, means for continually and automatically transferring said mold structures from one of said stations to said first-named means, and means for continually and automatically transferring molds from said first-named means to another of said stations; both of said transfer means operating in timed relationship with respect to each other.

16. In apparatus for making die-molded articles, a table, a track above said table, a plurality of mold structures adapted for movement continually over said table; each of said mold structures being separable into upper and lower sections, means for automatically grasping the upper section of a mold as it passes a predetermined position on said table, and means for lifting said grasping means with said upper section and moving said upper section to a position in alignment with said track.

17. In apparatus for making die-molded articles, a table, a plurality of mold structures adapted for movement continually over said table; each of said mold structures being separable into upper and lower sections, a pin on each lower mold section; a latch on each of said upper mold sections, means comprising a press for closing said latch about said pin, means for intermittently moving said mold structures across said table; and continuously moving means for releasing said latch from said pin while one of said mold structures is stationary.

18. In apparatus for making die-molded articles, a table, a plurality of mold structures adapted for movement continually over said table; each of said mold structures being separable into upper and lower sections, a pin on each lower mold section, a latch on each of said upper mold sections, means for automatically closing said latch from about said pin, means for automatically releasing said latch from said pin, and means operating in timed relationship with respect to said latch-releasing means for lifting an upper mold section from a lower mold section.

19. In apparatus for making die-molded articles, a table, a plurality of mold structures adapted for movement continually over said table; each of said mold structures being separable into upper and lower sections, a pin on each lower mold section; a latch on each mold section, means for closing said latch about said pin, means spaced from said last named means for releasing said latch from about said pin; said upper mold section having a groove, gripping means fitting into said groove for gripping said section, and means for lifting said gripping means and the upper section held thereby.

20. In apparatus for making die-molded articles, a table, a plurality of mold structures adapted for movement continually over said table; each of said mold structures being separable into upper and lower sections, means for locking said sections together, means for separating said sections at a point spaced from the position at which said sections were locked; a track above said table adapted to support the upper sections of said mold structures; said upper mold sections having grooves, and means for aligning the grooves in successive upper mold sections with said track.

21. In apparatus for making die-molded articles, a table, a plurality of mold structures adapted for continual movement over said table; each of said mold structures being separable into upper and lower sections, a track for supporting said upper mold section, means for moving the upper mold section along said track, and means at the end of said track for receiving said upper mold section and partially connecting said upper and lower mold sections.

22. In apparatus for making die-molded articles, a table, a plurality of mold structures adapted for continual movement over said table; each of said mold structures being separable into an upper and a lower mold section, means for separating said sections, a track for supporting said upper mold sections, means for moving said mold sections from said track and partially connecting them with said lower mold sections, means for automatically locking said mold sections together, and means for returning said locked sections to said separating means.

RICHARD W. DINZL.